US009070188B2

(12) United States Patent
Cuddeback

(10) Patent No.: US 9,070,188 B2
(45) Date of Patent: *Jun. 30, 2015

(54) SYSTEM FOR PREDICTING GAME ANIMAL MOVEMENT AND MANAGING GAME ANIMAL IMAGES

(71) Applicant: Non Typical, Inc., Green Bay, WI (US)

(72) Inventor: Mark J. Cuddeback, Green Bay, WI (US)

(73) Assignee: Non Typical, Inc., Green Bay, WI (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/067,406

(22) Filed: Oct. 30, 2013

(65) Prior Publication Data

US 2014/0050366 A1 Feb. 20, 2014

Related U.S. Application Data

(62) Division of application No. 12/826,861, filed on Jun. 30, 2010, now Pat. No. 8,600,118.

(60) Provisional application No. 61/221,992, filed on Jun. 30, 2009.

(51) Int. Cl.
*G06K 9/00* (2006.01)
*G06T 7/00* (2006.01)
*A01M 31/00* (2006.01)

(52) U.S. Cl.
CPC ..... *G06T 7/0022* (2013.01); *G06T 2207/10016* (2013.01); *A01M 31/002* (2013.01)

(58) Field of Classification Search
None
See application file for complete search history.

(56) References Cited

U.S. PATENT DOCUMENTS

| 5,121,367 | A | * | 6/1992 | Rose | 368/1 |
| 5,128,548 | A | * | 7/1992 | Goodson et al. | 250/341.1 |
| 7,738,082 | B1 | * | 6/2010 | Peters | 356/4.01 |
| 8,254,776 | B2 | | 8/2012 | Schnell | |
| 8,600,118 | B2 | * | 12/2013 | Cuddeback | 382/110 |
| 2003/0123737 | A1 | * | 7/2003 | Mojsilovic et al. | 382/224 |
| 2004/0162799 | A1 | * | 8/2004 | Schisler et al. | 706/62 |
| 2004/0208343 | A1 | * | 10/2004 | Golden et al. | 382/110 |
| 2005/0011470 | A1 | | 1/2005 | Skvorc, II | |
| 2005/0076004 | A1 | * | 4/2005 | Yanagisawa et al. | 707/1 |
| 2005/0123883 | A1 | * | 6/2005 | Kennen et al. | 434/11 |
| 2005/0153359 | A1 | | 7/2005 | Schaefer et al. | |
| 2005/0212912 | A1 | * | 9/2005 | Huster | 348/155 |
| 2006/0146122 | A1 | * | 7/2006 | McDonald et al. | 348/14.03 |
| 2006/0197024 | A1 | * | 9/2006 | Manber | 250/363.05 |
| 2006/0224327 | A1 | * | 10/2006 | Dunlap | 702/19 |
| 2007/0110281 | A1 | * | 5/2007 | Jurk | 382/110 |
| 2007/0247321 | A1 | * | 10/2007 | Okamoto et al. | 340/573.1 |
| 2008/0002064 | A1 | * | 1/2008 | Itoh | 348/668 |
| 2008/0066693 | A1 | * | 3/2008 | Bocquier | 119/859 |
| 2008/0294487 | A1 | * | 11/2008 | Nasser | 705/8 |
| 2009/0132467 | A1 | * | 5/2009 | Blewett et al. | 707/2 |

(Continued)

*Primary Examiner* — Shervin Nakhjavan
(74) *Attorney, Agent, or Firm* — Jansson Munger McKinley and Shape Ltd.

(57) ABSTRACT

A system for managing scouting images, including a scouting camera configured to record and store images of subjects at a particular location and an image management device which has a processor that creates a predictive statement based on image content of the images stored on the scouting camera or copies thereof and a display conveying the predictive statement to a user, wherein the predictive statement indicates a portion of a future time period that subjects are most likely to be at the particular location as compared to remaining portions of the future time period.

11 Claims, 17 Drawing Sheets

(56) References Cited

U.S. PATENT DOCUMENTS

| | | |
|---|---|---|
| 2009/0231441 A1 | 9/2009 | Walker et al. |
| 2009/0262137 A1* | 10/2009 | Walker et al. .................. 345/629 |
| 2010/0185627 A1* | 7/2010 | Se ................................. 707/752 |
| 2010/0246970 A1* | 9/2010 | Springer et al. .............. 382/195 |

* cited by examiner

Fig. 9

SYSTEM FOR PREDICTING GAME ANIMAL MOVEMENT AND MANAGING GAME ANIMAL IMAGES

RELATED APPLICATIONS

This application is a divisional of patent application Ser. No. 12/826,861, filed Jun. 30, 2010, which is based in part on Provisional Application Ser. No. 61/221,992, filed Jun. 30, 2009, the entirety of the contents of both applications are incorporated herein by reference.

FIELD OF THE INVENTION

The invention relates to game animal scouting cameras and, more particularly, to ways of analyzing and manipulating images or data from such scouting cameras and transforming the same into a predictive statement of game animal movement.

BACKGROUND OF THE INVENTION

Game animal observation for recreation and/or for scouting in association with hunting activities is growing increasingly popular. Game animal observation or scouting activities can include implementation of scouting cameras for taking photographs, video footage, or other video recordings. It is known and becoming increasingly popular to use digital scouting cameras for game animal observation, allowing users to, for example, save scouting images onto personal computers (PCs) for later viewing.

Scouting cameras for scouting potential hunting areas and determining game patterns, particularly without disturbing animal activity, are generally well known in the art. Typically, the apparatus includes a film, digital or video camera and a passive infrared sensor (e.g., a motion/heat sensor) that is adapted to sense movement and, in response, activate the camera focused on the area in which the sensor detects movement. Oftentimes, these devices include a delay timer with multiple settings to match specific conditions or locations, thus eliminating unwanted multiple exposures or other non-desired events. Moreover, such apparatus preferably includes high/low sensitivity settings to allow adjustment of the camera's effective range in order to photograph or record game at a desired distance.

Typical digital scouting cameras save images using known image file types. This allows users to view the images on their PCs using the image-viewing software installed on the PCs. The data storage media of typical digital scouting cameras is recognized by such PCs as being a computer drive or other ancillary computer device. Accordingly, to retrieve and view the images, users navigate through the computer device or file mapping to select the images they want to view or transfer to their PCs or use one of a variety of image-viewing software packages that may be installed on their PCs.

In other words, typical digital scouting cameras require multiple steps or utilizing multiple software programs to organize and view images. If image enhancement or modification is desired, then even more software programs may be required. This not only can be cumbersome and time consuming but at times can be confusing for users.

Besides trying to organize their collected images, game animal observers frequently engage in their observing and/or hunting activities during periods of increased game animal activity. For example, many game observers and/or hunters will refer to Solunar Tables (developed by John Knight) for estimates of fish and game activity levels based on solar and lunar characteristics on a particular day. Solunar Tables estimate fish and game activity levels based on data that relates to numerous species and numerous locations, and, typically, the tables are made after considering all days within a calendar year.

However, known Solunar Tables at times do not adequately account for seasonal, location, and species specific variables. Such variables include species specific movement patterns that are influenced by breeding activity of a species, seasonal food availability at a particular location, predatory activity at that particular location, and other game-animal-related variables. Stated another way, game animal behavior is influenced by numerous factors including, for example, time-of-year, breeding seasons, and other factors, which may not be suitably addressed by information presented in known Solunar Tables.

OBJECTS OF THE INVENTION

It is an object of the present invention to provide a system for managing game animal scouting images that improves the state-of-the-art by overcoming the aforesaid problems of the prior art. More specifically, it is an object of the present invention to provide an image management system which reduces the complexity of the user interface compared to the complexity of known image managing systems. It is a further object of the present invention to provide a system which allows full management of the images, enhancement of the images, single-click image classification or sorting, game animal herd evaluations based on the images, and/or predictions based on image herd movement trends that correspond to image content.

These and other objects of the invention will be apparent from the following descriptions and from the drawings.

SUMMARY OF THE INVENTION

The present invention is a system for managing scouting images which includes a scouting camera configured to record and store images of subjects at a particular location and an image management device which itself includes a processor that creates a predictive statement based on image content of the images stored on the scouting camera or copies thereof and a display conveying the predictive statement to a user. In such inventive system, the predictive statement indicates a portion of a future time period that subjects are most likely to be at the particular location as compared to remaining portions of the future time period. In some embodiments of the inventive system, the future time period is a single day.

In preferred embodiments of the inventive system, (a) the subjects are game animals and the particular location is a particular hunting location, (b) the predictive statement indicates relative likelihoods of game animals being at the particular hunting location for multiple portions of the future time period, (c) at least some of the multiple portions of the future time period occur within a time period that corresponds to a jurisdictionally-defined legal hunting period for the future time period, and (d) the relative likelihoods are expressed in terms of at least one of a more-or-less indication and a percentage indication.

In additional preferred embodiments of the system for managing scouting images, the predictive statement includes relative likelihoods of subjects being at the particular location for morning portions, afternoon portions, and evening portions of the future time period. In some of these preferred embodiments, the predictive statement includes relative likelihoods of game animals being at the particular hunting location for multiple morning portions and multiple evening portions of the future time period.

In other preferred embodiments, the processor creates the predictive statement based on images recorded within a user-defined time period, and in some of these embodiments, the subjects are game animals and the user-defined time period corresponds to a jurisdictionally defined hunting season. In other of these embodiments, the processor creates the predictive statement based on occurrences of the user-defined time period over multiple years.

In some preferred embodiments of the inventive system, the predictive statement includes at least one of lunar information and solar information and/or day-length information.

Preferred embodiments of the inventive system may convey global positioning information of the particular location on the display.

The present invention is also a method of managing game animal scouting images which comprises (a) recording and storing images of game animals with a game animal scouting camera, (b) transferring the images from the game animal scouting camera to an image management device, (c) assigning time-of-day information for each of the images corresponding to a time-of-day when each of the images was recorded, and (d) generating a predictive statement relating to a likelihood of game animal presence on a future time period based on the time-of-day information of the images and the number of game animals recorded in the images.

In some preferred embodiments of the inventive method, at least one of (a) the time-of-day information and (b) the number of game animals recorded in the images for a user-defined time period are considered to generate the predictive statement.

Preferred embodiments of the inventive system for managing game animal scouting images have a game animal scouting camera configured to record and store images of game animals and an image management device which include (a) a memory device that stores images retrieved from the game animal scouting camera, (b) a display device for displaying the images thereon, (c) multiple classification inputs corresponding to respective ones of multiple game animal characteristics, the multiple classification inputs allowing a user to classify the image as showing a game animal having one or more of the multiple game animal characteristics, and (d) a sorted database organizing the images according to the user-classified game animal characteristics of the respective images.

In preferred embodiments of the inventive system, the multiple classification inputs are provided in a graphical user interface that is displayed on the display device. In some of these preferred embodiments, the image management device automatically retrieves the images from the game animal scouting camera.

The game animal scouting camera assigns time and date information to each image in other preferred embodiments of the inventive system. Other preferred embodiments include image-enhancing inputs allowing a user to modify characteristics of the images, and some such embodiments, modifying characteristics of an image does not alter such characteristics of a stored copy of the image.

In many preferred embodiments of the inventive system, the images include still-images and video clips.

In yet additional embodiments of the inventive system, the game animal characteristics include gender or age. In some of these embodiments, the image management device determines and displays a herd statement on the display device based at least in part on the user-classified game animal characteristics of the respective images. In some embodiments, the herd statement conveys a ratio of male game animals to female game animals. In some embodiments, the herd statement conveys a ratio of mature game animals to immature game animals. In some embodiments, the herd statement conveys a ratio of large-antlered/horned game animals to small-antlered/horned or non-antlered/horned game animals.

In additional preferred embodiments of the inventive system, the image management device assigns solar-positioning information to an image based at least partially on information relating to the date at which the game animal scouting camera recorded the image and the location of the game animal scouting camera. In other embodiments, the image management device assigns solar-positioning information to an image based at least partially on information relating to the date at which the game animal scouting camera recorded the image and the location of the game animal scouting camera. In yet other embodiments, the image management device assigns lunar-phase information to an image based at least partially on information relating to the date at which the game animal scouting camera recorded the image and the location of the game animal scouting camera.

In yet other embodiments, the image management device determines and displays a predictive statement on the display device. Such predictive statement is based at least in part on (a) the user-classified game animal characteristics of the respective images, (b) solar-positioning information assigned to the images, and (c) the global positioning information assigned to the images and the predictive statement conveys information relating to a likelihood of a user seeing game animals at some future time at the same global position at which the images were recorded.

In many preferred embodiments of the inventive system, the image management device is a personal computer. Further, in many preferred embodiments, the game animal scouting camera and the image management device are integrated into a single apparatus. Also, in many embodiments, the image management device utilizes global positioning data to determine location.

The present invention is also a method of managing game animal scouting images which includes the steps of: (a) recording and storing images of game animals with a game animal scouting camera; (b) transferring the images from the game animal scouting camera to an image management device; (c) displaying the images on a display device cooperating with the image management device; (d) classifying the images based on characteristics of game animals visible in the images; and (e) generating a statement relating to game animal herd composition based on image classification information.

BRIEF DESCRIPTION OF THE DRAWINGS

FIGS. 8-12 are computer screen shots of the display being used with the system of FIG. 1 showing compiled data charts or tables created by the herd data module.

DETAILED DESCRIPTION OF PREFERRED EMBODIMENTS

Figure 1:
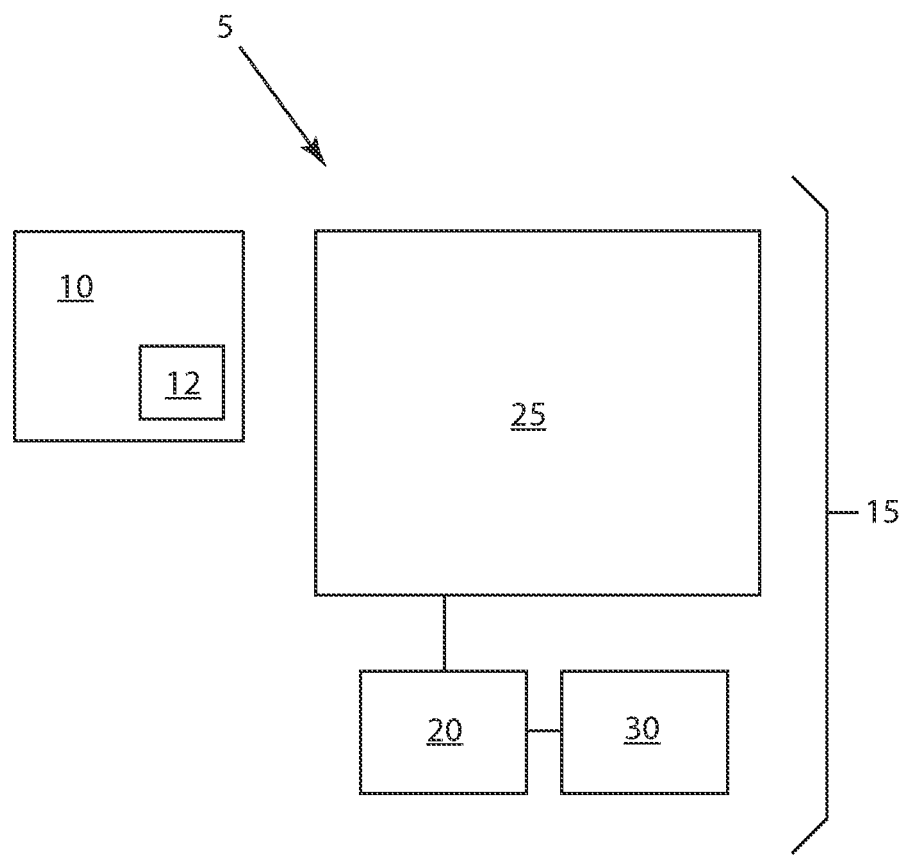
FIG. 1 is a schematic view of a system of the invention.

With initial reference to FIG. 1, an embodiment of a system 5 for managing game animal scouting images and predicting game animal movement is shown. System 5 can manage and enhance videos and/or still photos, collectively referred to herein as "images". System 5 allows a user to evaluate image contents and sort the images into one or more predefined or user-defined categories or classifications. Based at least in part on such classification(s), system 5 can calculate, generate, or otherwise perform various herd evaluations. System 5 can use such historic herd evaluations and/or movement trends identified in the images collectively to predict future herd movement at a given location based on the image contents.

Compared to known image managing systems, inventive system 5 reduces the complexity of the user interface, compared to known prior art systems, while allowing, for example, full management of the images, enhancement of the images, single-click image classification or sorting, game animal herd evaluations based on the images, and predictions based on image herd movement trends that correspond to image content.

As a further description of system 5 generally, the predictive and evaluative functions of system 5 can be fully customizable by the user to adapt to a user's particular requests or goals at a given time because the system 5 utilizes a "living" or dynamically-changing database that contains data (e.g., photos) that is location- or property-specific. As a user contributes more data or photos to the database, it develops into a more comprehensive representation of game presence or movement at the particular location(s) where the photos were taken. In this regard, system 5 can identify game movement or presence trends at the particular location and correspondingly predict with a high degree of accuracy when and where a subsequent "high activity" day will occur.

As a continued general overview of system 5, a user can input information into the system 5 by, for example, loading or transferring photos from a particular location (or, multiple locations on a single parcel of land, optionally from multiple parcels of land) into system 5. The photos can by classified or labeled, either automatically by the system 5 or manually by way of user input(s), so that system 5 can recognize the photo content, preferably identifying whether such photos contain game animals and, if so, what type of game animals have been found.

In this regard, system 5 creates a hunting or geographical location-specific database that is made from the user's own photos. System 5 can use such location-specific database to output default reports that show, for example, overall census information as well as the number of game animal sightings (number of game animals captured in the user's photos) and display the number of game animal sightings as functions of any of a variety of variables, including but not limited to, solar or lunar information, calendar date, environmental factors, and/or others. These reports can be customized or other reports generated based on the user's preferences or the particular information that the user wants to draw or derive from the database.

System 5 can analyze the reports or the database itself to identify trends or notable occurrences, for example, to identify if there are certain occasions or periods in which relatively many game animals are seen in the photos, in other words, high activity levels. System 5 (and/or user) can correlate such high activity levels to any factors such as various time-related, date-related, solar-related, lunar-related, and/or other factors.

If system 5 (or the user) finds a correlation between high game animal activity levels and some identifiable factor within the reports or database, then system 5 can create a corresponding prediction file that characterizes such correlation and can be used to forecast future occurrences of high game animal activity levels. In some embodiments, the prediction file can be an electronic file saved on system 5 that includes a table or report that is accessible by a reverse lookup-type procedure. In some embodiments, the prediction file can be an electronic file saved on system 5 that includes an algorithm or mathematical function that expresses the correlation between the high game animal activity levels and the identified factor in the report or database.

Stated another way, the database used by system 5 is typically configured as a highly location-specific database, since it is created solely or primarily based on photos from a single location, or optionally from a limited number of locations. This allows system 5 to analyze game animal herd characteristics at the particular location and predict game animal presence, movement, or high activity levels at the particular location based on previous behavior of game animals at such particular location. Such prediction can be outputted by system 5 and therefore conveyed to the user in a predictive statement. The user can review and consider the predictive statement and correspondingly use the predictive statement to make certain hunting decisions, such as when to hunt within a hunting season, when to hunt on a particular day, which particular location within a parcel of land to hunt, and/or other decisions.

Various parameters of game movement or presence trend analyses and trend identifications or identification of high activity level can be altered, (re)defined, or otherwise modified, adjusted, or customized. In some embodiments, this customizable feature allows a single predictive file to include different types of predictions and thus allows the system to output predictive statements that can convey any of a variety of forecast-type information. The particular forecast-type information that is outputted to the user in a prediction statement can depend on the user's particular wants and goals that the user can input into system 5 by inputting, manipulating, or adjusting various system parameters (explained in greater detail elsewhere herein), or otherwise. Adjusting such parameters allows system 5 to, for example, consider only certain data and ignore other data while looking for game movement or presence trends (such trends can be moving trends, changes in rates of sighting occurrences, and/or others as desired).

Suitable parameters include, but are not limited to, time- or date-related parameters such as (I) date ranges, (ii) years across which the date ranges are considered, (iii) specific calendar dates, (iv) solar status/dates, (v) lunar status/dates, (vi) actual times-of-day, (vii) time proximity with respect to dawn, (viii) time proximity with respect to dusk, (ix) time proximity with respect to noon, (x) time proximity with respect to midnight, (xi) and/or other date- or time-related parameters. The parameters can also include, but are not limited to, environmental factors such as (I) high or low temperatures of a day(s), (ii) variations or change in temperatures of a day(s), (iii) actual temperature when photo was taken, (iv) barometric pressure, (v) weather front movement characteristics, (vi) precipitation type, (vii) precipitation intensity, (viii) and/or other environmental factors.

Any combinations of the above-listed or other parameters can be used to help sort data and to facilitate identifying game movement or presence trends at the particular location. Furthermore, minimum, maximum, moving, or re-definable threshold values can be used to help define what data within the database will be analyzed for identifying game movement or presence trends. For example, data that corresponds to days in which no bucks or no deer were seen can be disregarded, depending on the particular type of prediction sought.

Still referring to FIG. 1 and now describing particular components, system 5 includes a game animal scouting camera 10 and an image management device 15. Scouting camera 10 is configured for use in the outdoors and able to endure typical weather conditions for relatively extended periods of time. Suitable scouting cameras are available from Non Typical, Inc. of DePere, Wis., and are sold under the Cuddeback® brand. Scouting camera 10 triggers or records when game animal motion is detected, recording images and/or video of such game animals in a memory block 12 or other suitable image or data storage medium. After scouting camera 10 is deployed for a desired amount of time, for example, one or more days, one or more weeks, or other periods of time, the images that are recorded by camera 10 are duplicated on or transferred to image management device 15, a procedure which is explained in greater detail elsewhere herein.

Still referring to FIG. 1, image management device 15 includes a processing block 20 which includes suitable memory, processor(s), and/or other hardware and software for performing the system logic. Processing block 20 communicates with a display device 25 that is, for example, a monitor or other device for displaying and conveying information to users. Processing assembly 20 also communicates with and receives instructions from a user input system 30 that is configured to allow users to control operations of the image management device 15. In some preferred embodiments, the entire image management device 15 is incorporated into a personal computer.

Figure 2:
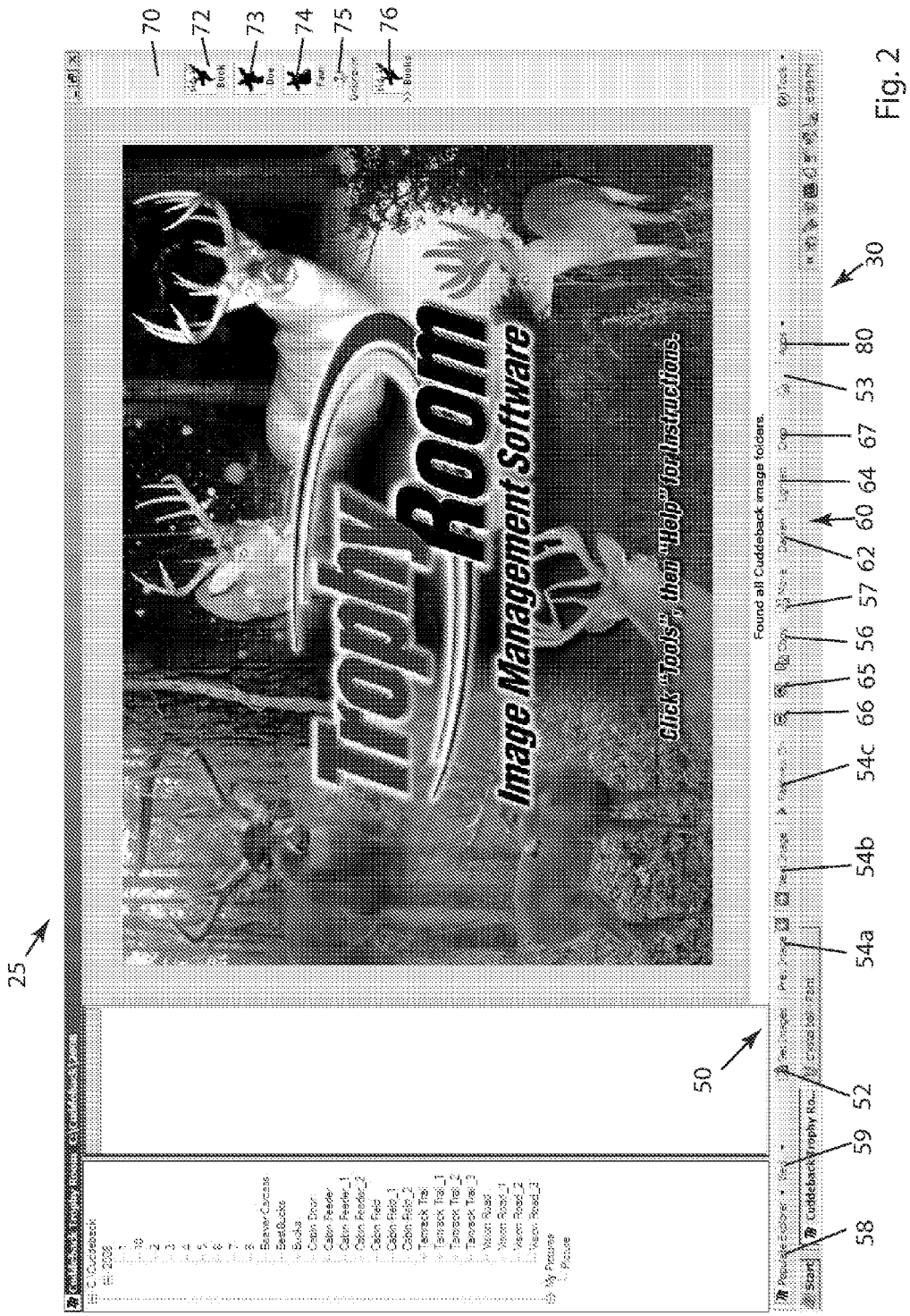
FIG. 2 is a computer screen shot of a display being used with the system of FIG. 1.
Figure 3:
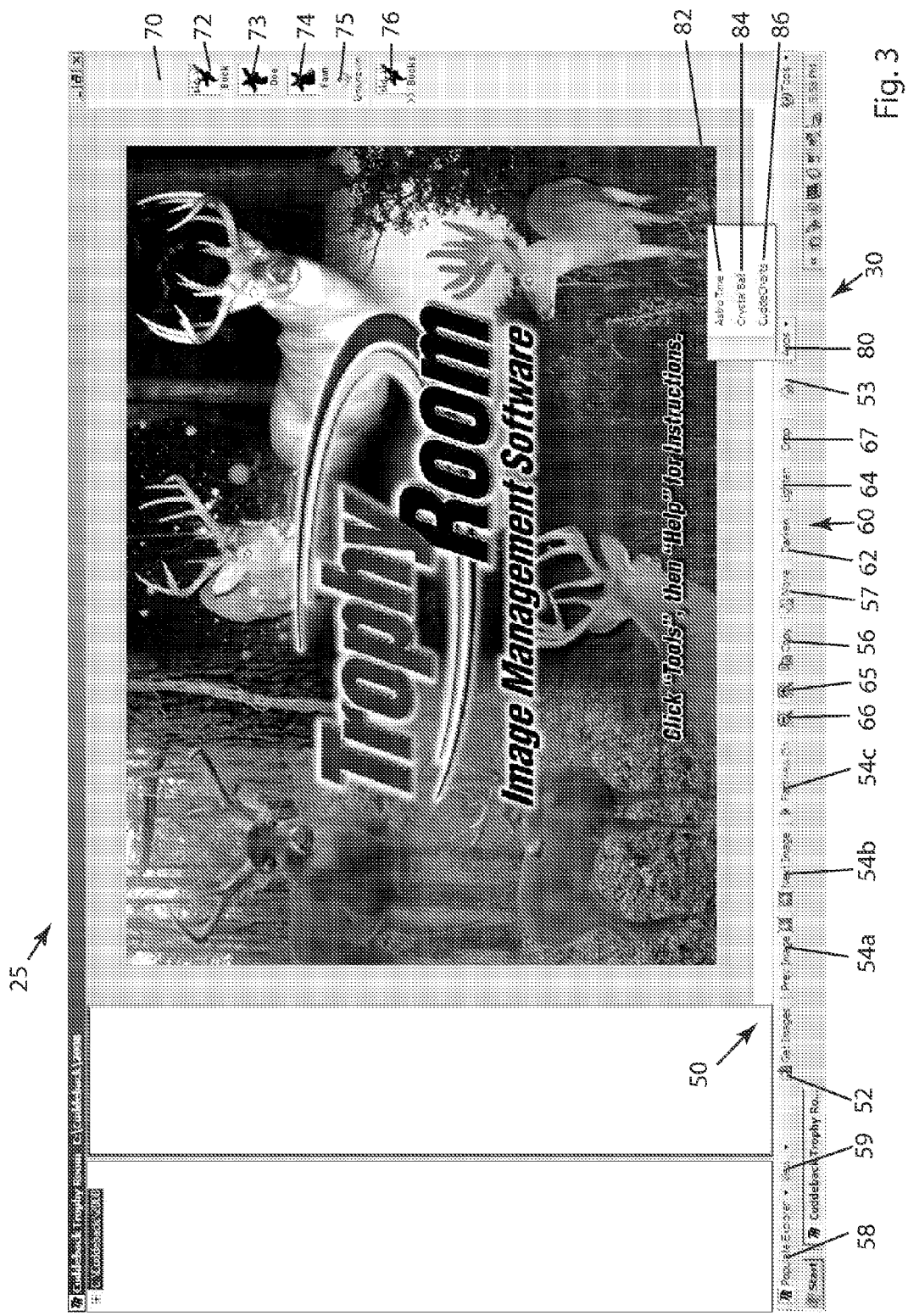
FIG. 3 is a computer screen shot of the display being used with the system of FIG. 1 showing various component options of applications of the invention.

Referring to FIGS. 1-3, user input system 30 can be incorporated as components of a graphical user interface. Accordingly, for implementations of system in which the image management device 15 is incorporated into or otherwise implemented upon a personal computer, the user input system can include at least some mouse-clickable buttons displayed on the monitor or display device 25. It is noted that such mouse-clickable buttons may also be controlled by various keyboard or other functions of the personal computer being used as part of system 15.

Figure 4:
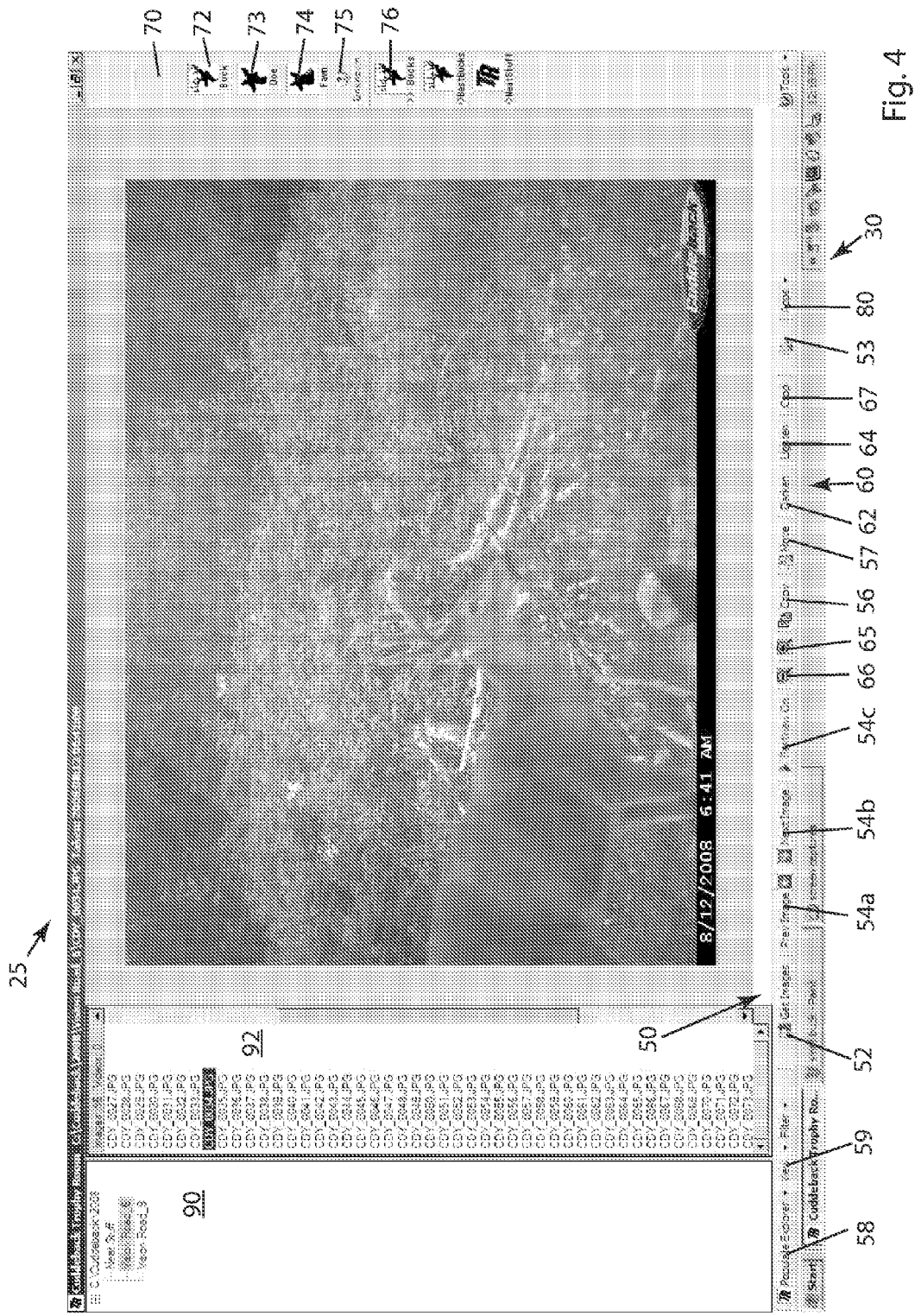
FIG. 4 is a computer screen shot of the display being used with the system of FIG. 1 showing an image in a main window and showing a list of saved images in another window.
Figure 5:
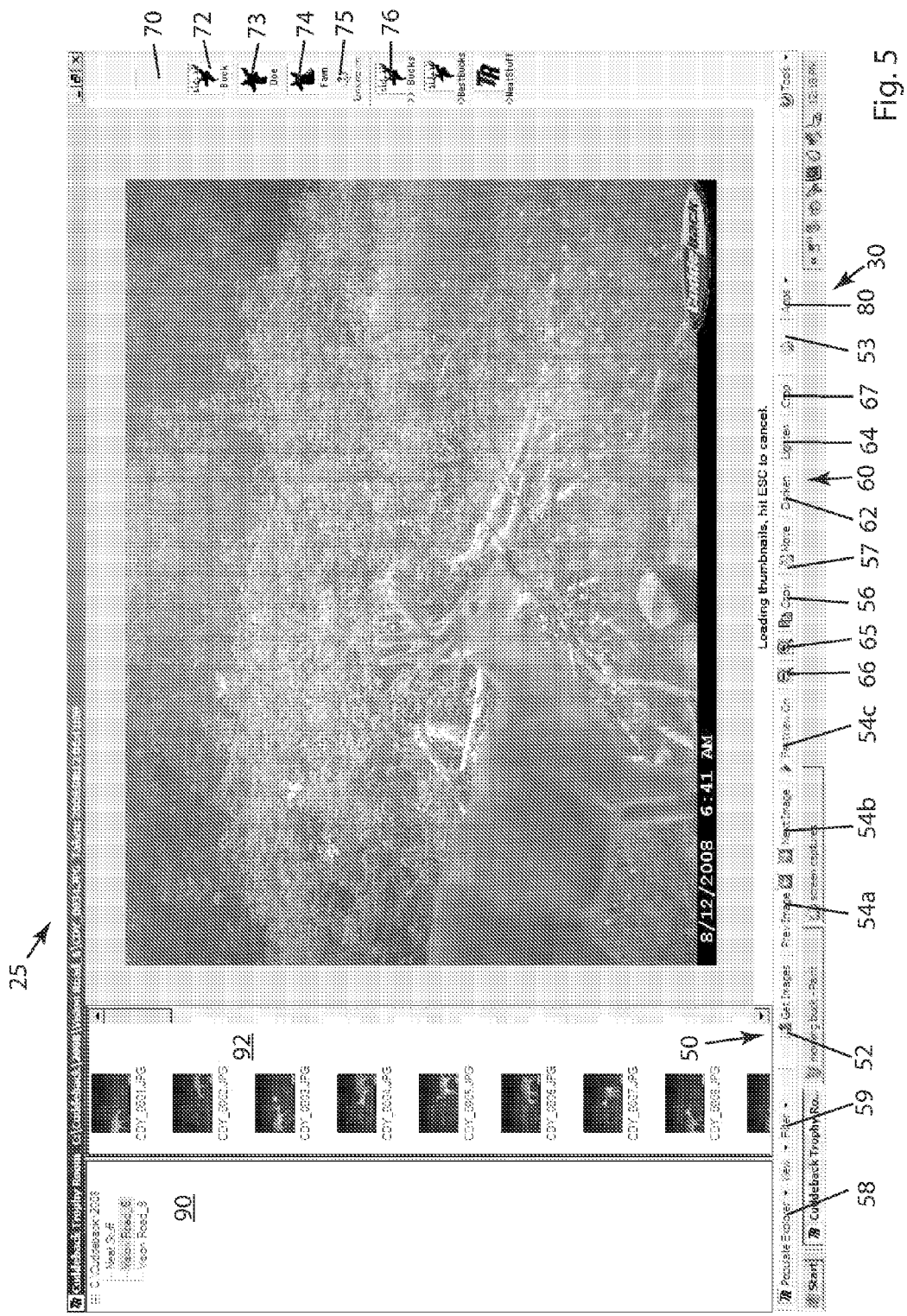
FIG. 5 is a variant of the computer screen shot of FIG. 4 showing thumbnail views of the images in the list of saved images.

Referring now to FIGS. 4-5, user input system 30 includes general controls 50, enhancement controls 60, rapid features 70, and applications 80. The general controls 50 control such basics features of system 5 as, for example, downloading or transferring images from camera 10 to image management device 15, file management of the images, and image-viewing such as advancing or backing up through multiple images, printing images, and/or other functions. For example, general controls 50 can include a Get Images button 52 that allows users to transfer images to image management device 15 with a single click. Preferably, clicking Get Image 52 button not only transfers images but also files them by default by date, for example, in a separate folder for each year that the image was taken according to its image creation date or other file characteristic such as an associated date stamp.

As another example of the features within general controls 50, a Print button 53 allows for single-click printing. Previous and Next Image buttons 54a and 54b are provided for sequentially navigating through the images. Fast View button 54c automates the viewing of the images by displaying them in a rapidly progressing slide show. Furthermore, Copy and Move buttons 56 and 57 facilitate corresponding file management functions for coping and/or moving selected images into other files or directories viewable in one or multiple windows or window segments in the graphical user interface shown on display device 25. Such multiple windows or window segments can themselves, or their displayed contents, be controlled by way of, for example, Populate Explorer and View buttons 58 and 59.

Still referring to FIGS. 4-5, enhancement controls 60 allow users to alter the images as desired. Enhancement (image-enhancing) controls 60 include Darken and Lighten buttons 62 and 64 for adjusting the relative hue or brightness of the images, Zoom In and Zoom Out buttons 65 and 66 for magnifying or shrinking the images, and Crop button 67 for removing unwanted portions of the images.

Rapid features 70 allow a user to categorize or classify the images, optionally to save a copy of an image to another location, with a single click or input. In some embodiments, rapid features 70 include Buck, Doe, Fawn, and Unknown classifying buttons 72, 73, 74, and 75, respectively. A user views the game animal(s) in an image and clicks on which of these classifying buttons 72, 73, 74, and 75 describes the category or proper classification of such animal(s). Such assigned image classification can be embedded into the image file. Other buttons such as a Copy to Buck Folder button 76 allows users to create folders that contain only images of the respective category.

Figure 6:
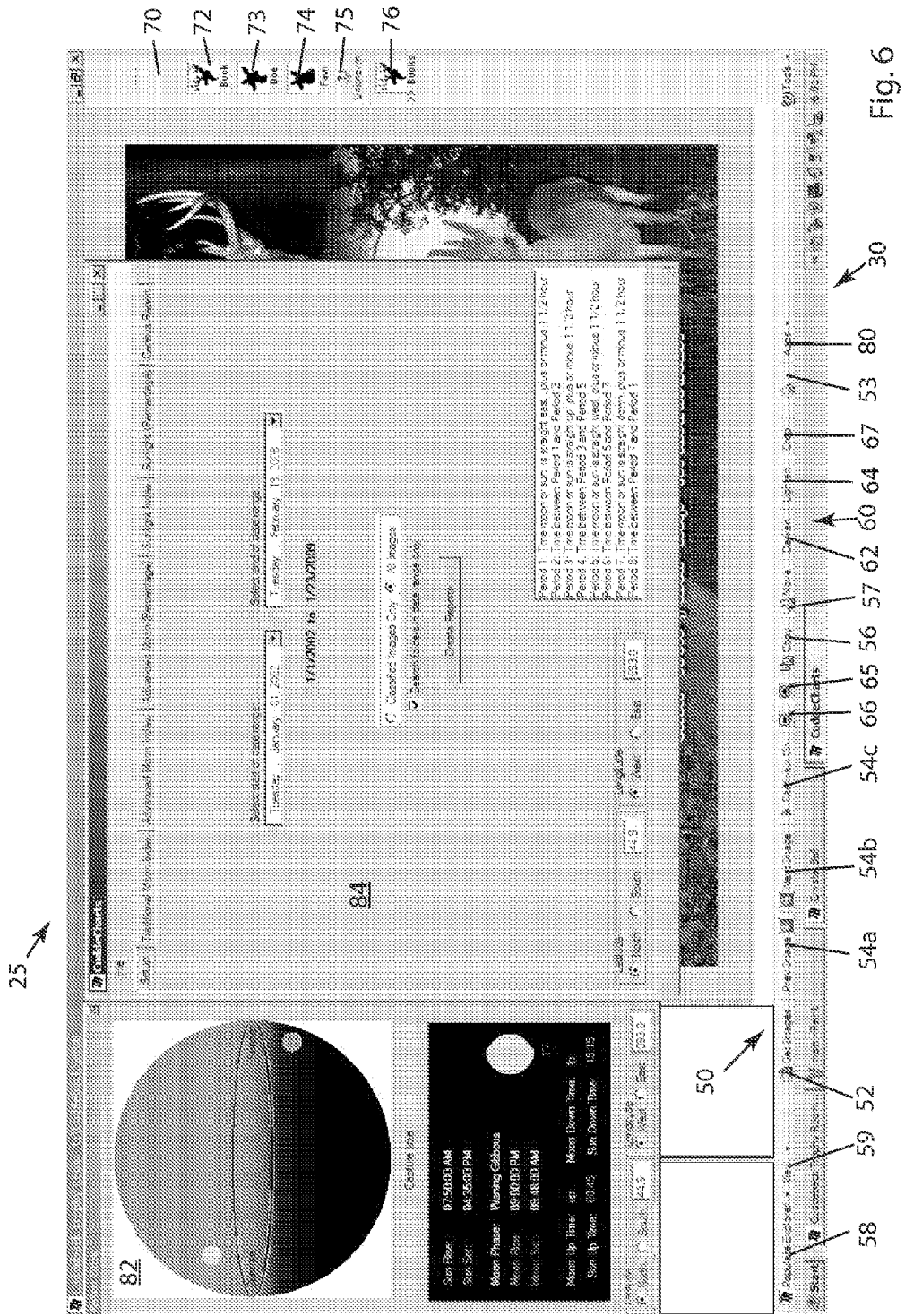
FIG. 6 is a computer screen shot of the display being used with the system of FIG. 1 showing a user interface allowing user date range setup of a herd data module of the invention.

Referring now to FIGS. 3 and 6, applications 80 allow a user to create and access various herd reports, analyses, and predictions based on the image content and corresponding lunar, solar, date, and time, and/or otherwise evaluate a particular game animal herd at a particular geographical location. Applications 80 include a solar/lunar module 82 labeled as Astro Time™ showing sun and moon rise and set times, as well as moon phase, for a particular geographical location and date.

Figure 7:
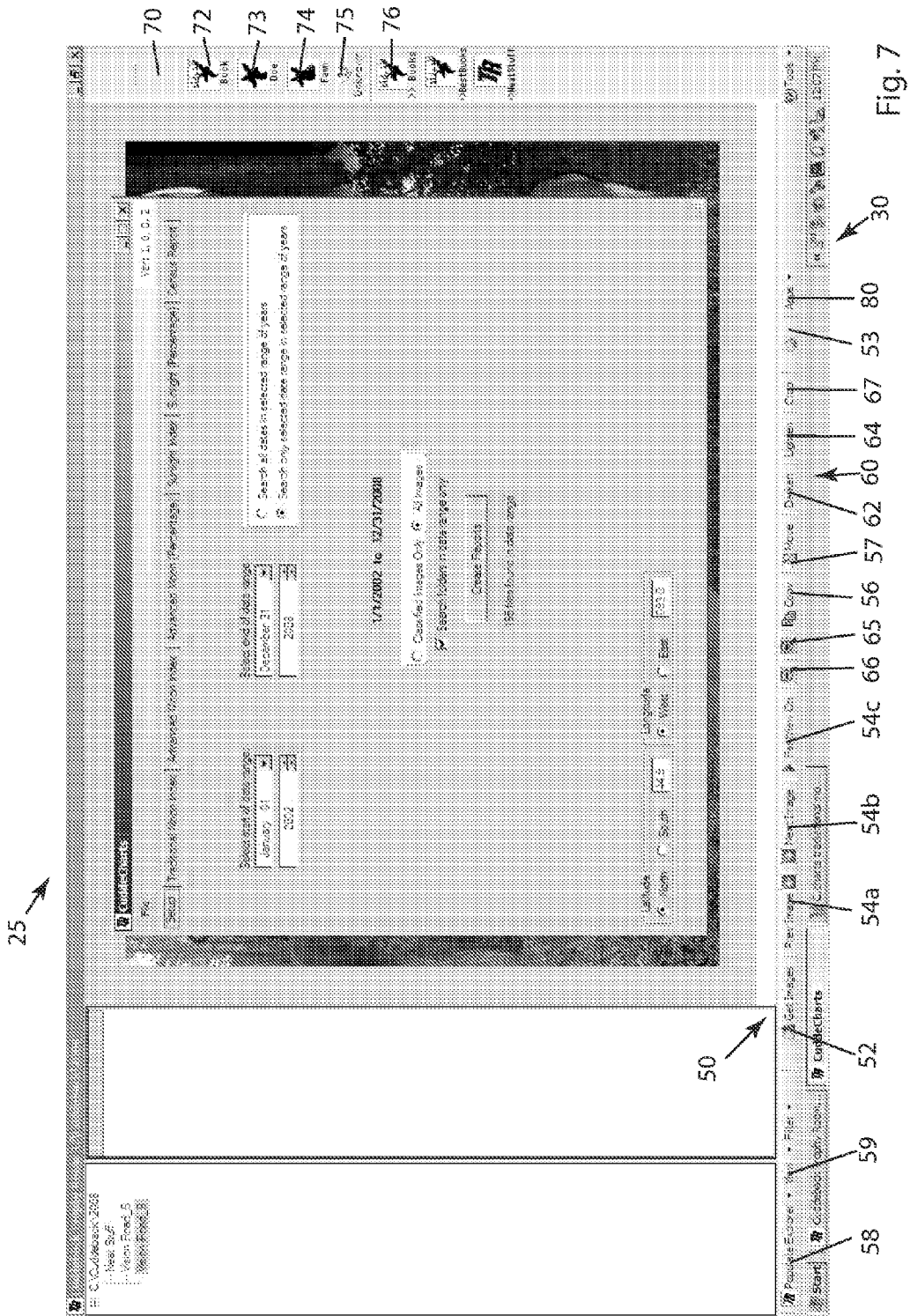
FIG. 7 is a variant of the computer screen shot of FIG. 6 showing a main screen of a herd data module after the image related data has been tabulated.
Figure 8:
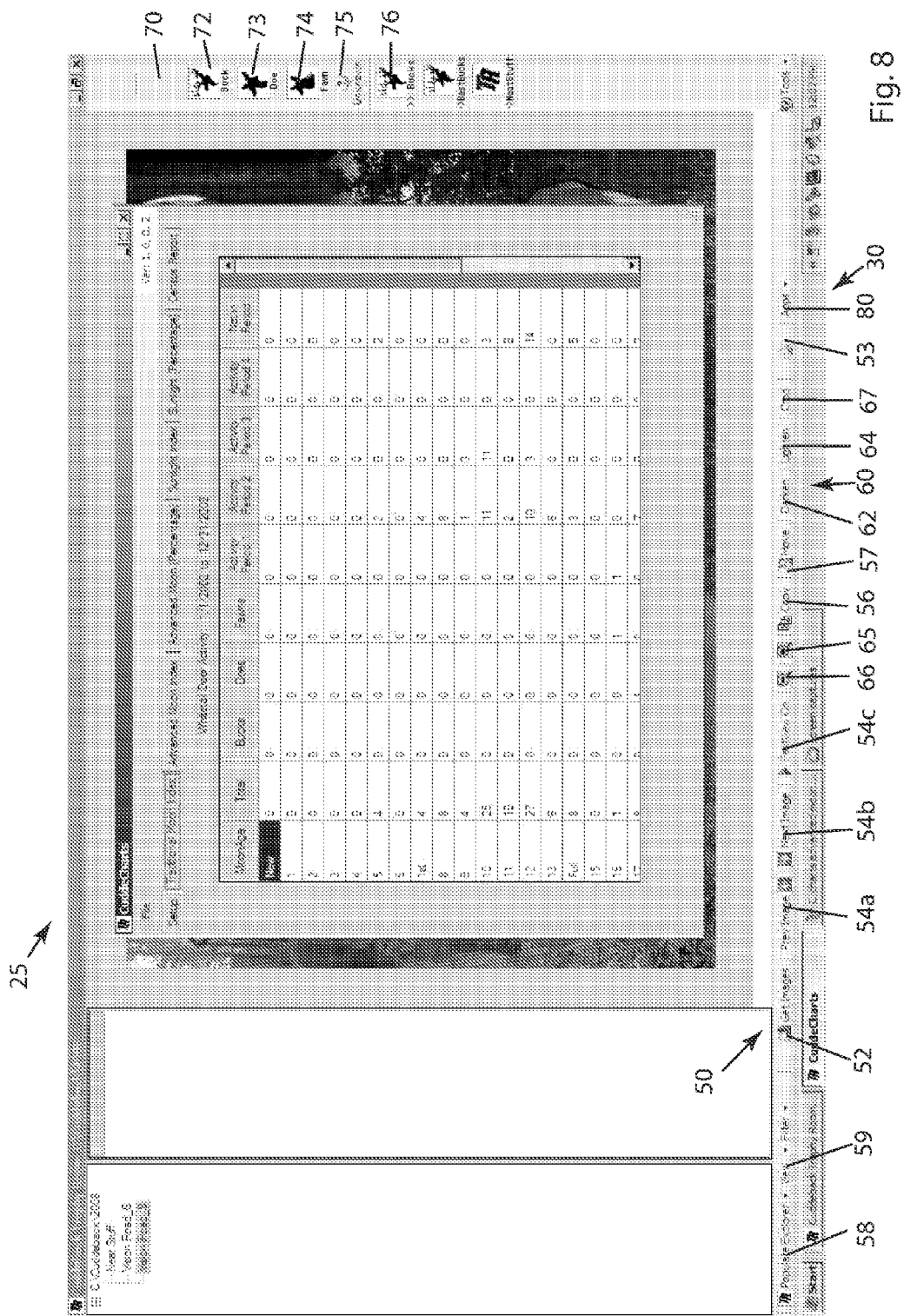
Figure 9:
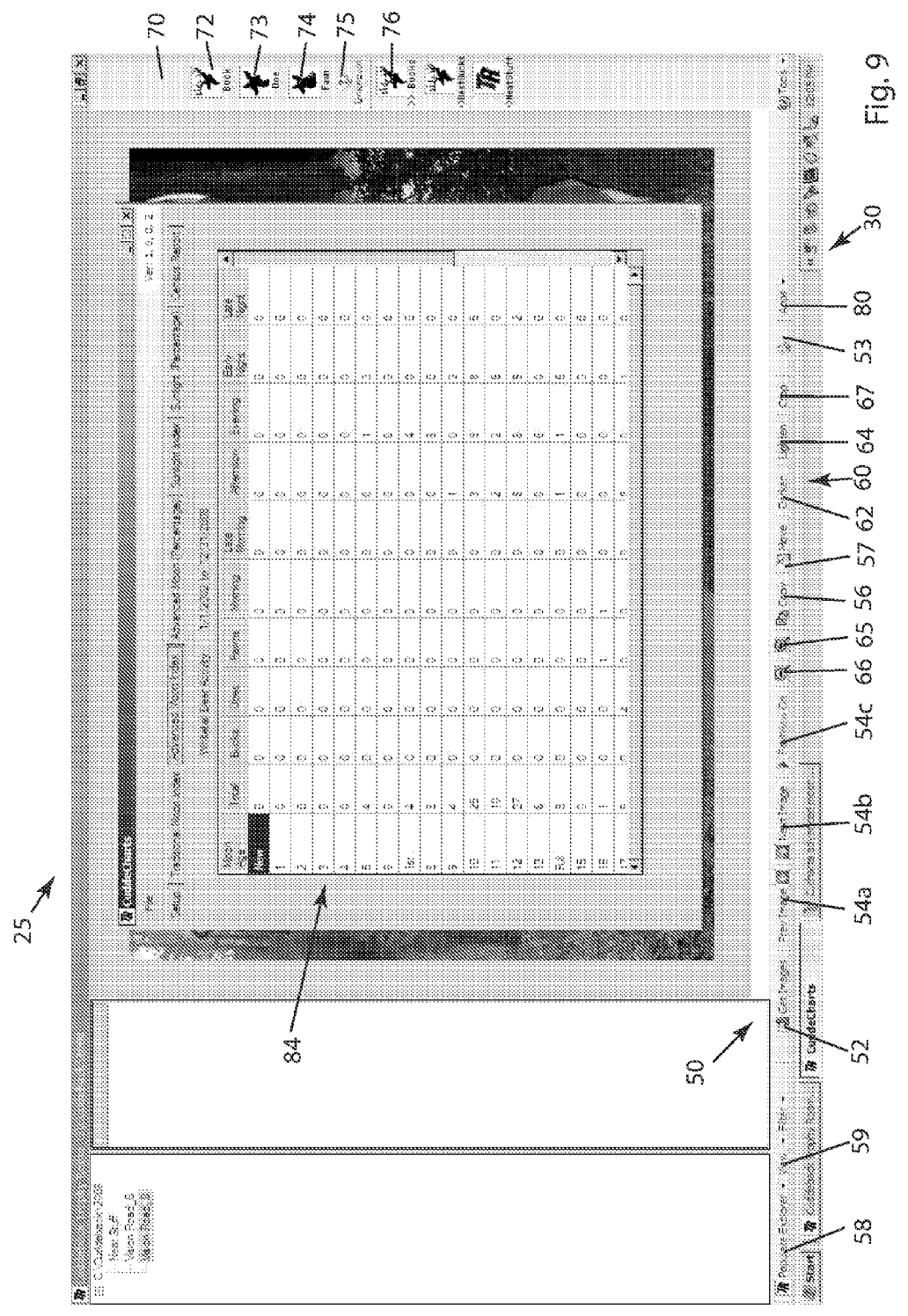
Figure 10:
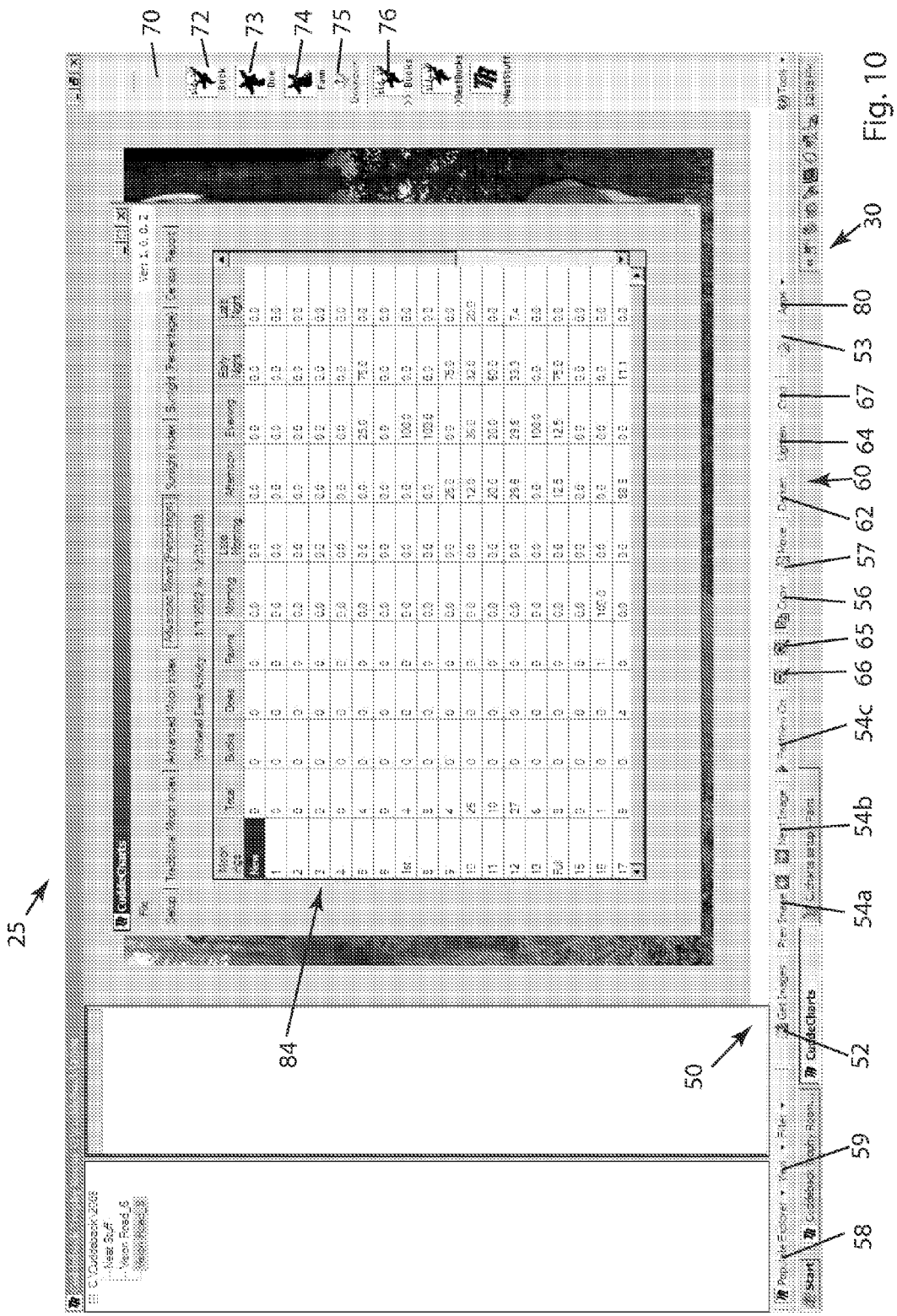
Figure 11:
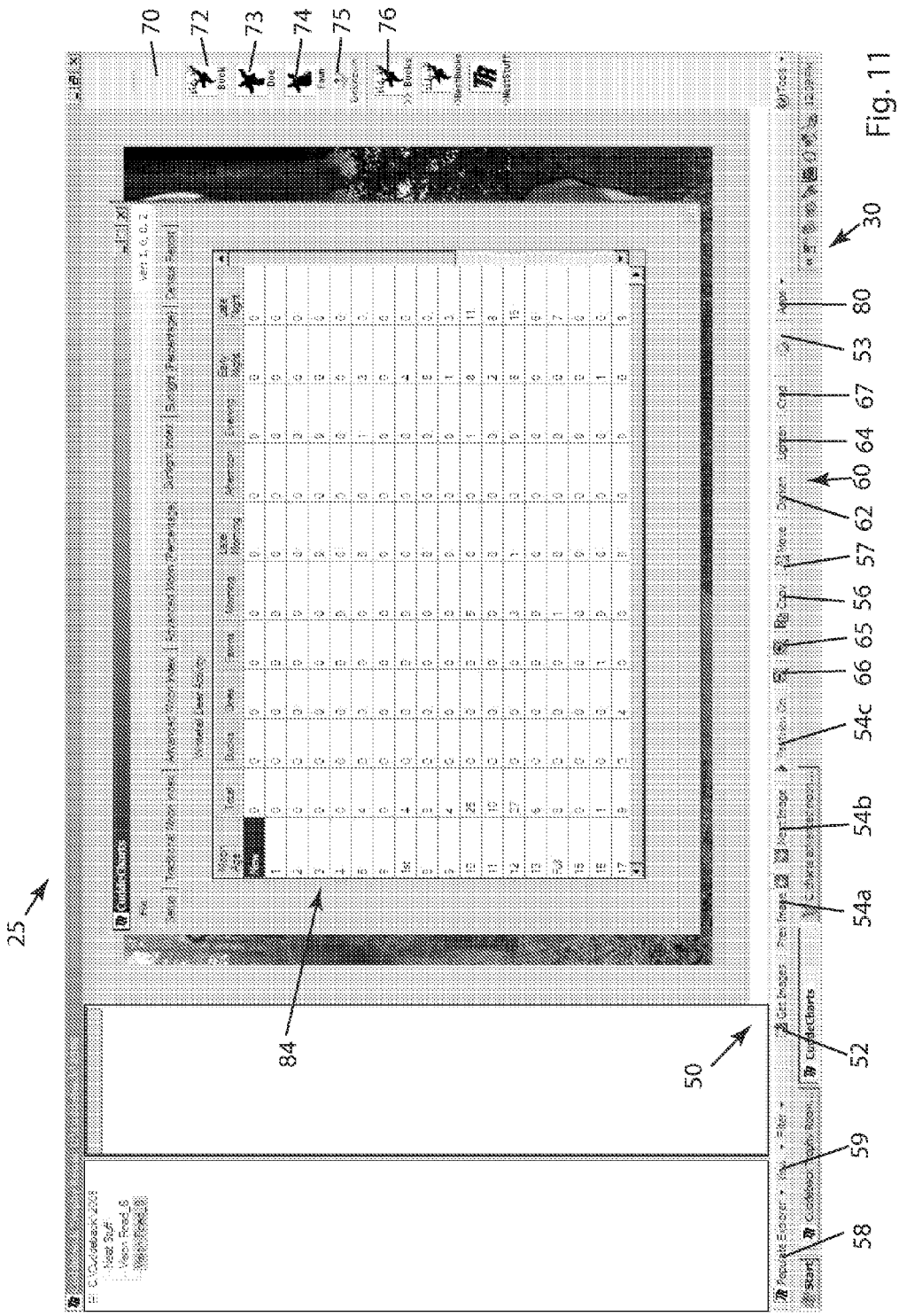
Figure 12:
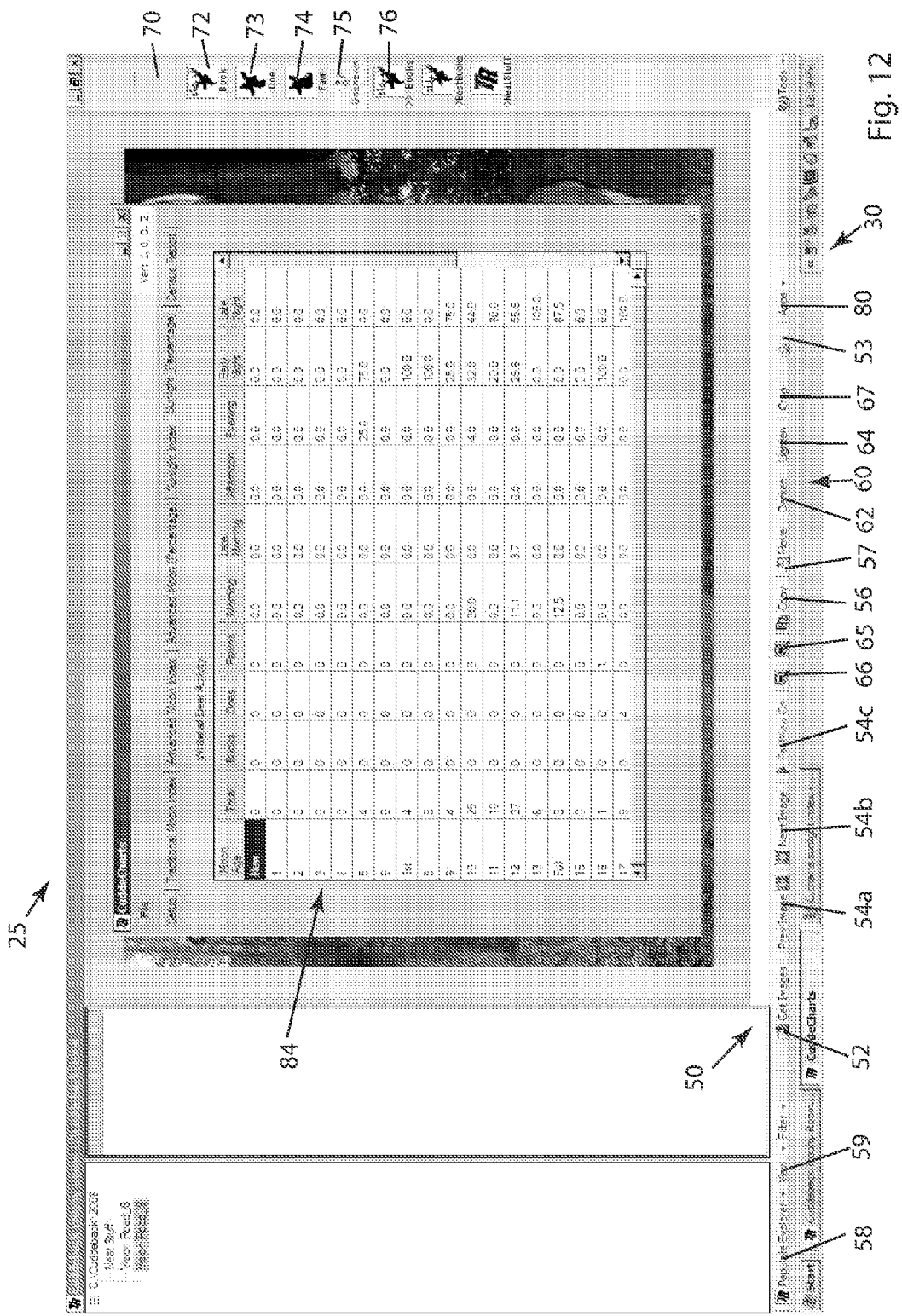

Referring now to FIGS. 6-13, as another feature of applications 80, a herd data module 84 (also see FIG. 3) labeled as CuddeCharts™ is configured to generate customized reports for a user-selected time period (FIGS. 6-7). After entering preliminary or setup information to instruct system 5 which time period and location to analyze (FIGS. 6-7), herd data module 84 can generate and display herd data that shows game animal total numbers and breakdowns of gender, maturity, and time-of-day. Such data can be displayed in terms of traditional or advanced moon (lunar) indices (FIGS. 8 and 9), or moon percentages (FIG. 10), and, optionally, a sunlight index (FIG. 11) or percentage (FIG. 12).

Figure 13:
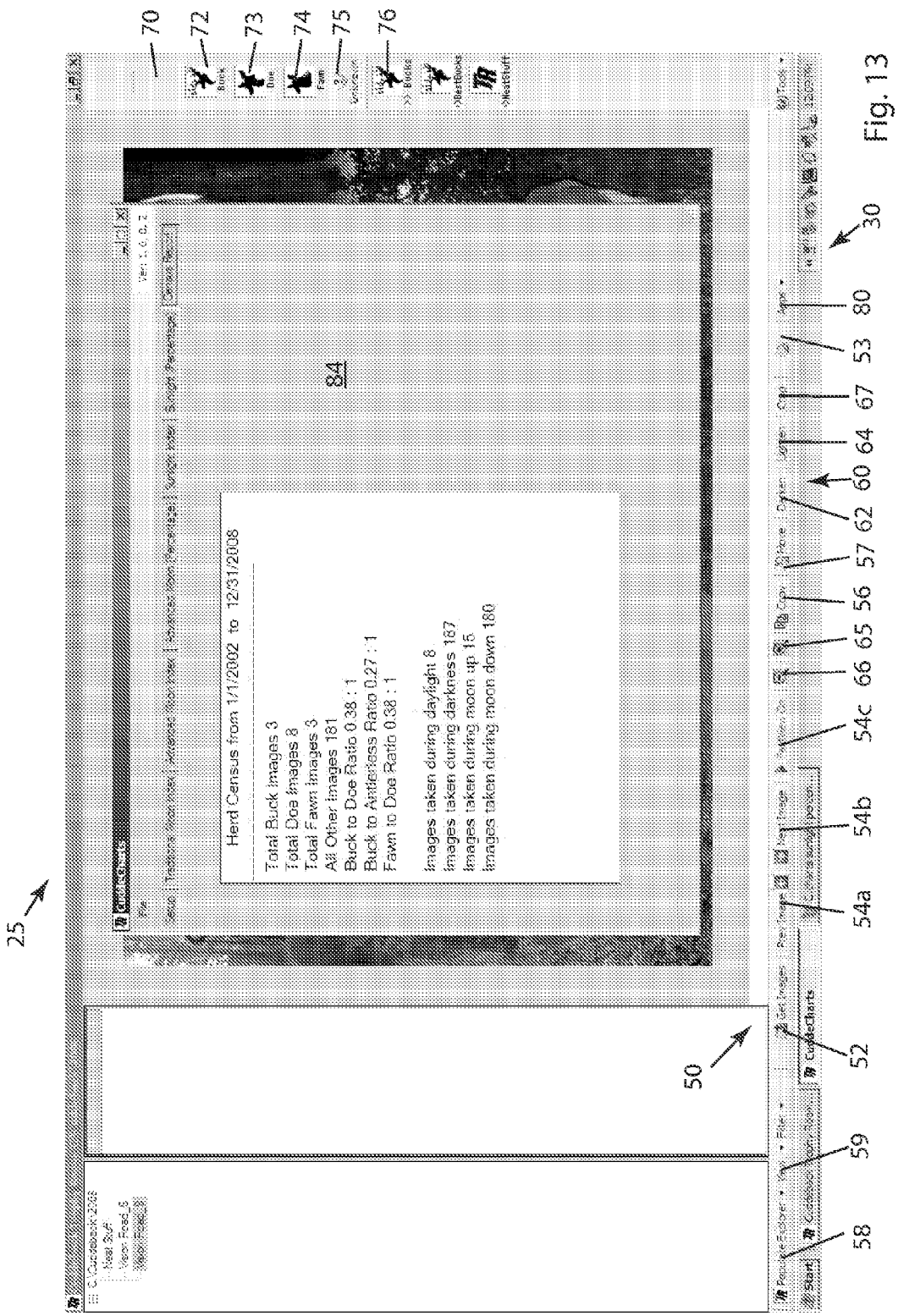
FIG. 13 is a computer screen shot of the display being used with the system of FIG. 1 showing a census report created by the herd data module.

Herd data module 84 can display herd census information in a report that shows population and corresponding breakdowns of gender, maturity, and/or other categories (FIG. 13). Such herd statements provided by system 5 can also determine and display information such as a ratio of mature game animals to immature game animals and/or a ratio of male game animals to female game animals. For example, one such piece of information can be a ratio of large-antlered/horned game animals to small-antlered/horned or non-antlered/horned game animals. FIG. 13 shows such exemplary information as a "Buck to Antlerless Ratio." The results of other such possible ratio analyses are also shown in FIG. 13 as a "Buck to Doe Ratio" and a "Fawn to Doe Ratio."

Figure 14:
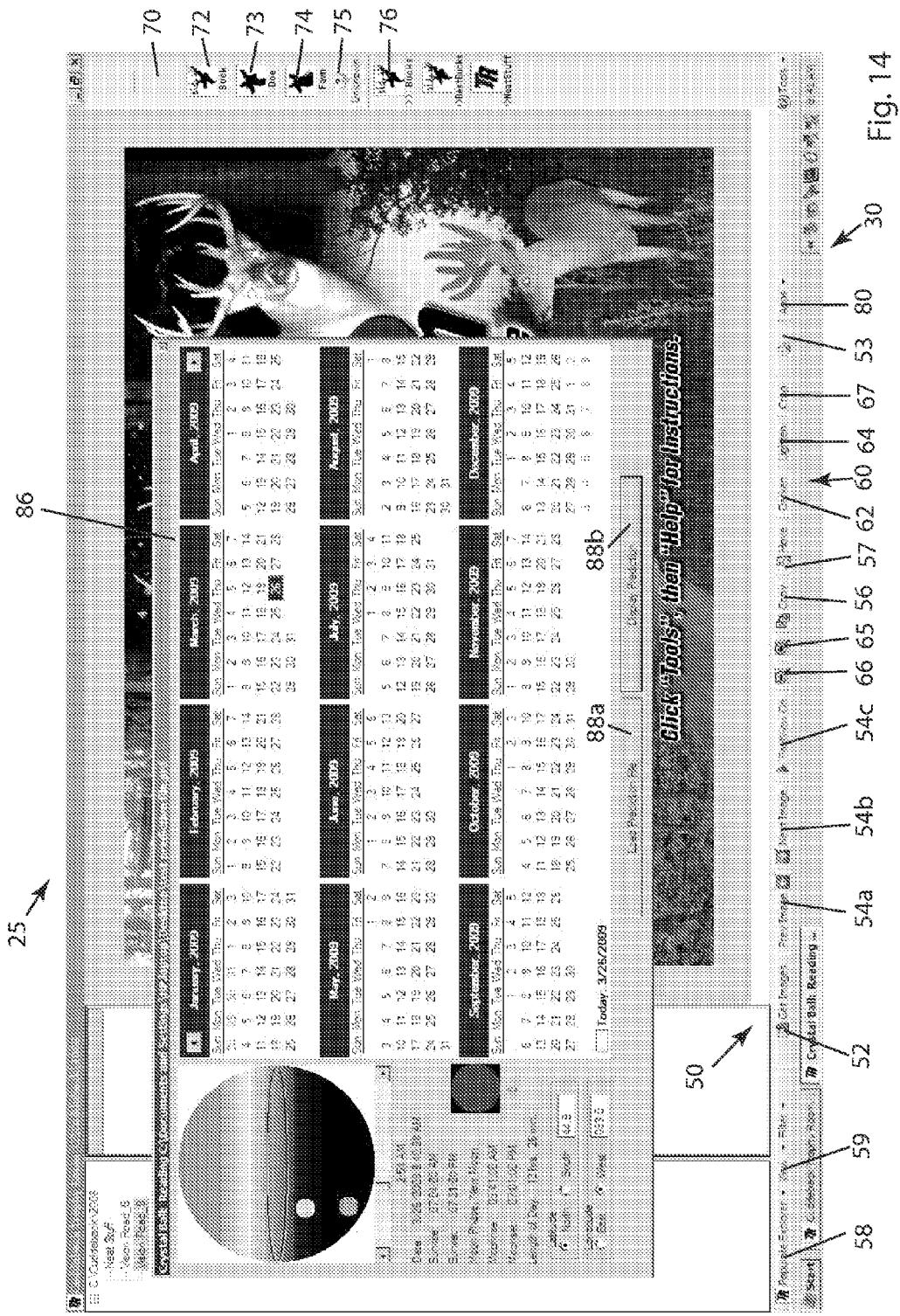
FIG. 14 is a computer screen shot of the display being used with the system of FIG. 1 showing a calendar used by a prediction module of the invention for selecting a future date for which a prediction is sought.
Figure 15:
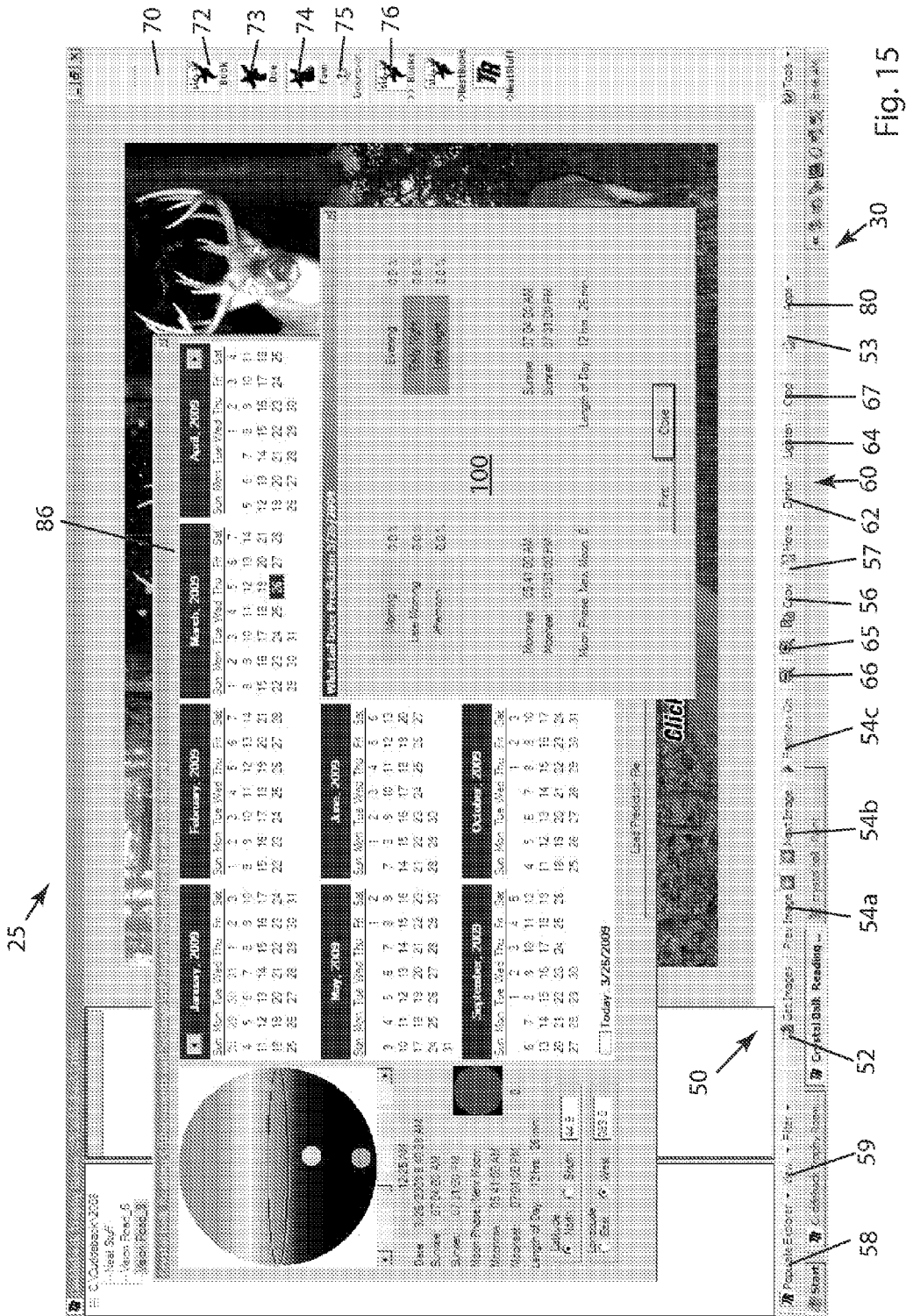
FIG. 15 is a computer screen shot of the display being used with the system of FIG. 1 showing a prediction statement generated by the prediction module.

Referring now to FIGS. 14 and 15, in preferred embodiments, applications 80 further include a prediction module 86 (also see FIG. 3) labeled as Crystal Ball™. Prediction module 86 allows a user to upload a prediction file and generate a herd-specific movement prediction for a particular property or geographical location. The prediction statement is generated based on past herd movement of the same herd as exemplified by the images within system 5. Stated another way, prediction module 86 allows a user to select a future date, and system 5 analyzes the images therein to identify any previous herd movement tendencies which may indicate what the herd activity will likely be at such future date.

In light of the above, and referring again to FIG. 1, to use system 5, a CF (Compact Flash) or SD (Secure Digital) memory card 12 is installed in a suitable game camera, in this embodiment a Cuddeback® scouting camera 10. Scouting camera 10 is mounted at a location where game animal recordation is desired, for example, at or near a hunting location. Once mounted, scouting camera 10 automatically records images in a known manner. When the images are taken, scouting camera 10 embeds date and time information into each of the images. When the images are to be evaluated, memory card 12 is removed from scouting camera 10 and inserted into a suitable card reader that cooperates with image management device 15.

Referring now to FIGS. 1-5, the user clicks Get Images button 52 or uses a corresponding command executed by a keyboard, such as a "hot key" command. After the images are transferred from memory card 12 to image management device 15, memory card 12 can be cleared or erased, if desired. At that point, display device 25 will show a list 90 of folders, for example, on the far left portion of a personal computer screen. The files just copied will be in one or more of the newly-created folders shown. Double-clicking a folder will open it, and a list 92 of image files will be displayed in the center window.

Double-clicking a single image file will display that image in the large viewing portion of the personal computer screen. Right-clicking on the image itself displays viewing or deleting options for that image. When an image is being displayed, clicking Previous and Next Image buttons 54a and 54b will display previous and subsequent images, respectively. To view the images in a rapid slide show, the user clicks Fast View button 54c. Clicking Fast View button 54c a second time ends the rapid slide show.

For managing the folders and images, by default, system 5 stores the images on the personal computer in a folder labeled, shown in FIG. 2 in this example as "Cuddeback," and further within a common-year subfolder "2008." Thus, in this case, all images loaded in 2008 will be in a location "C:\Cuddeback\2008." System 5 will then create new subfolders in the year subfolder, 2008 in the above example, for each folder copied from memory card 12 using Get Images 52 command. The user can then rename such new subfolder in any suitable manner, for example, as shown in FIG. 2. Such renaming can be done by right-clicking on the folder to be renamed.

While viewing individual images, a user can click Print button 53 which launches a print operation through an operating system of the personal computer. For example, clicking Print button 53 can launch Microsoft's® Fax Viewer that is included with Windows® XP, but other operating systems use other image viewing software. Furthermore, the user can manipulate enhancement controls 60 to alter how an image is shown on display device 25. For example, if desired, the user can zoom in on an image by left-clicking the mouse while moving the mouse to draw a box. The user can then restore the full image by left-clicking on the image. Optionally, Zoom In and Zoom Out buttons 65 and 66 can be used to accomplish the same by clicking on the portion of the image that should be zoomed into and then clicking Zoom In or Zoom Out buttons 65 or 66 corresponding to the desired function.

Of course, other image altering or enhancements can be accomplished such as controlling image brightness with Darken and Lighten buttons 62 and 64 or cropping an image using Crop button 67. Regardless of whether the images are altered or enhanced, while viewing them, the user can use rapid features 70 to quickly create copies of the images in appropriate ones of various categorized folders. Categorization-related information can be used by image management device 15 to generate census-type statements such as buck/doe/fawn ratios within a whitetail dear herd.

Referring now to FIGS. 6-15, after viewing and categorizing the images, a user can then evaluate the herd census or other characteristics and also make animal behavior predictions using applications 80, such as herd data module 84 (CuddeCharts™ data mapping algorithm) and prediction module 86 (Crystal Ball™ prediction software). The user controls, defines, redefines, or otherwise manipulates such evaluation or other parameters that applications 80 use by selecting, for example, date range, day/time periods within the date range, and which location or property group of photos that the applications 80 will consider while analyzing or evaluating.

The below non-limiting examples are generally discussed in terms of moon phase (or other characteristics) or solar position (or other characteristics). It is, of course, contemplated and well within the scope of the invention that the same or largely-analogous general concepts apply equally for operating the system while considering other parameters, e.g., non-solar or non-lunar characteristics such as the various other parameters mentioned elsewhere herein.

Continuing the discussion of one type of exemplary evaluation or analysis, image management device 15 reads the image embedded date and time information and may determine the sun position, moon position, and moon phase at the time and location where the image was taken. For example, image management device 15 can utilize user-entered (global positioning system) GPS coordinates and a software-based algorithm to determine the sun and moon rise/set times at those GPS coordinates. Image management device 15 then determines the moon phase for the day the image was taken. A moon phase number from 0 to 28, representative of the phase of the moon from new moon to first quarter, to full moon, to last quarter, and back to new moon, is assigned for each image.

For each moon phase day, the number of images taken is tabulated, for example, using techniques based at least partially on, for example, the previously-mentioned Solunar Table methodology for showing periods of heightened fish and animal movements. Furthermore, data can be tabulated into four periods (which are the times the moon is straight east, straight up, straight west, and straight down) for each of the 29 moon phase days. The East and West periods are each two hours long while the Up and Down periods are each one hour long. For each moon phase day, the data are preferably tabulated into multiple periods of the day that correspond closely to how hunters usually hunt, or typical hunting day segments.

For example, each moon phase day can be divided into six time periods such as: (I) morning (thirty minutes before sunrise to three hours after sunrise); (ii) late morning (three hours after sunrise to twelve o'clock-noon); (iii) afternoon (twelve o'clock-noon to three hours before sunset); (iv) evening (three hours before sunset to thirty minutes after sunset); (v) early night (thirty minutes after sunset to twelve o'clock-midnight); and (vi) late night (twelve o'clock-midnight to thirty minutes before sunrise).

Such tables can show a user, for example, a portion of a day (at a particular moon phase) that has the greatest animal activity level. Preferably, a user can specify a date range to create custom tables, by specifying a particular range of days that is tabulated and how many years the specified date range will be considered. Once the tabulations are generated, a corresponding predictive report can be saved into a computer file, indicative of herd movement or game animal presence at various times of day, for days within a specified date range, and for particular moon phases at the particular property or location. For example, such predictive reports or files can then be used to predict future game animal behavior based on past animal behavior of the same animals or at least animals at the same location. The predictive report or prediction file is created by selecting the File option in herd data module 84 (CuddeCharts data mapping algorithm) and selecting "create prediction file" and saving it in a desired location. It is, of course, contemplated that such prediction file creation can instead be automated and/or automated with user options to customize the prediction file creation.

Referring now to FIGS. 14 and 15, once at least one prediction file is created, predictions can then be generated through prediction module 86 (Crystal Ball prediction software). A user clicks a Load Prediction File button 88a (see FIG. 14) to select and load a desired prediction file, for example, one that corresponds to a date range for which the prediction is sought. The user then selects a future date from a calendar and clicks a Display Prediction button 88b (FIG. 14). Prediction module 86 determines what the moon phase will be for the date selected, refers to the moon phase data in the prediction file, and then displays such information for the user. This is preferably done in a prediction statement 100 (see FIG. 15) that is shown on display device 25 and can be printed in hardcopy by the user. Prediction statement 100 can indicate relative likelihoods of game animals being at the particular hunting location for multiple portions of the selected future day or other time period.

Figure 16:
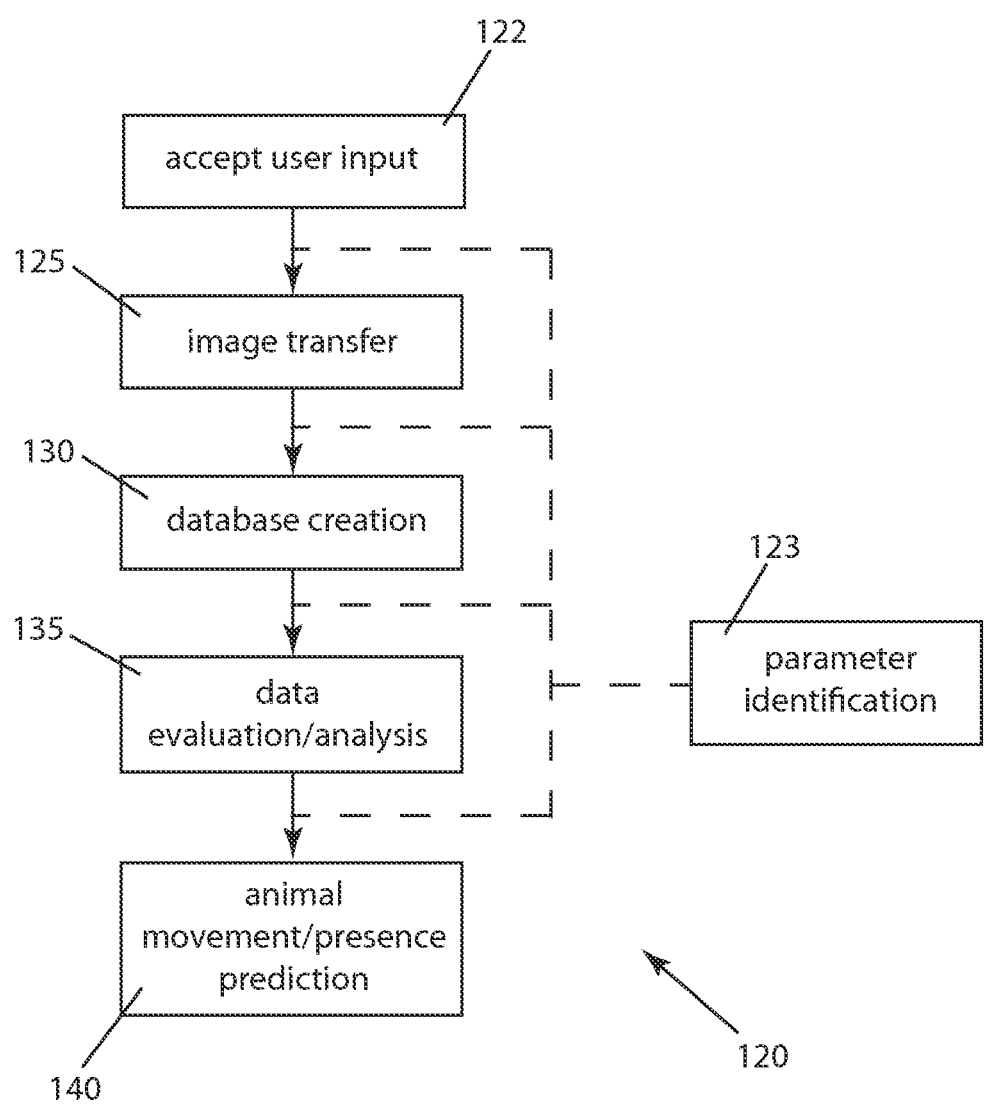
FIG. 16 is a block diagram flowchart illustrating a method of managing scouting images of subjects according to a preferred embodiment.
Figure 17:
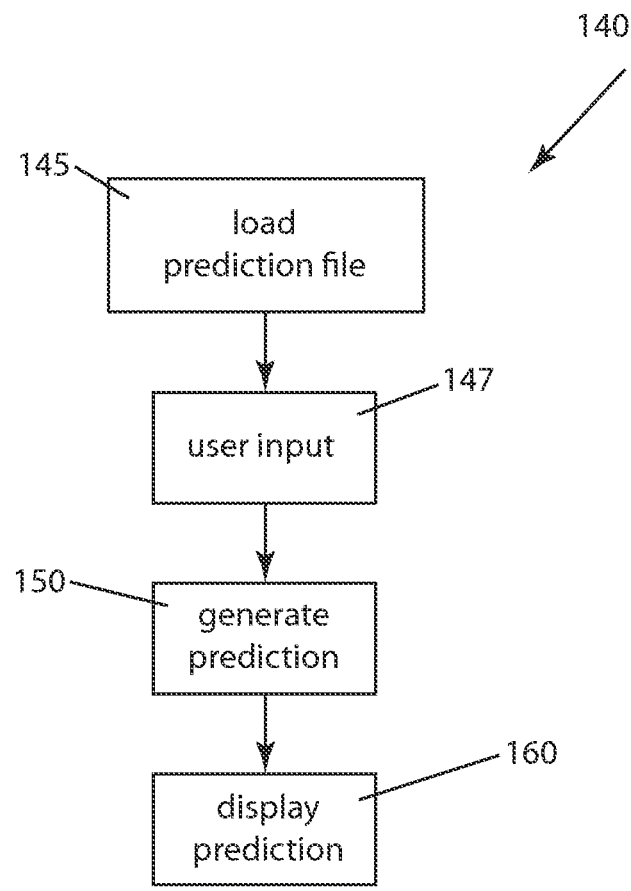
FIG. 17 is a block diagram flowchart illustrating that portion of the method of FIG. 16 directed to generating a prediction (e.g., a predictive statement).

Referring now to FIGS. 16 and 17, an exemplary prediction method 120 is described. Method 120 shows one technique for prediction generation that evaluates historical game movement or presence trends at a particular location. In some embodiments, this is based on all or selected parts of the user's data compilation associated with that location or collection of locations, for example data relating to photo identifiers and corresponding game animal activity levels or sighting numbers, alone or as functions of solar information, lunar information, photo identifiers, and/or other factors. In other words, rather than generating a prediction based on theory (such as Solunar Tables), predictions are generated based on actual game movement at the location of interest (as recorded by the user).

It is noted that although the various procedures within method 120 are shown as sequences of blocks, this is merely exemplary and for simplicity of explanation, whereby procedures within 120 can be performed in any of a variety of suitable orders or sequences. Exemplary method 120 of FIGS. 16 and 17 uses a reverse lookup-type procedure to show a likelihood of future game movement or presence. Other predictive techniques besides reverse lookup-type procedures can also be utilized including, but not limited to, creating algorithms or mathematical functions that represent game animal movement or presence trends or occurrences, for example, how they correlate to one or more of the various system parameters or other identifiable factors. In the particular example of FIGS. 16 and 17, the reverse lookup-type procedure is based on a correlation between a system parameter, moon phase in this particular example, of a future date and that or those historically seen at the particular location. Here again, it is, of course, contemplated and well within the scope of the invention that the same or largely analogous general concepts apply equally for creating and outputting prediction statements while considering other parameters, e.g., non-solar or non-lunar characteristics such as the various other parameters mentioned elsewhere herein.

Referring now to FIG. 16, method 120 of system 5 is described in yet another way, for example, as a sequence of blocks. In Block 122, a user determines his ultimate observation or hunting goals which will correspond to the type of custom prediction that will be generated. For example, a user may know that he has only one weekend (or one time frame, e.g., mornings) to hunt during a hunting season and wants to see as many deer as possible during that weekend. He can then use system 5 to generate a location-specific prediction of which weekend, for example, season opening or season closing weekend, he will have a relatively better chance of seeing the greatest number of deer. Or the user may have only one weekend to hunt during a hunting season and wants to see as many bucks as possible during that weekend, in which case he can use system 5 to generate, for example, a location-specific prediction that indicates whether he is more likely to see a lot of bucks during the season opening or season closing weekend. As another example, if multiple cameras 10 are utilized at different segments or portions of a single location (property), for example, multiple cameras 10 near multiple tree stands or other blinds, the user may wish to decide which tree stand to utilize during opening weekend of the hunt. He can then use system 5 to generate a location-specific prediction to determine in which of the multiple tree stands he will likely see more deer on a particular day, again based at least in part on historical information and corresponding game animal movement or presence trends on that particular property.

Referring still to exemplary method 120 of FIG. 16, at or between any of the Blocks, the various parameters that are considered can be manipulated, as represented by Block 123. The images are at some point transferred to image management device 15 in an image transfer Block 125. As described in greater detail elsewhere herein, the images can be manipulated as desired at this or at another time during the sequence. Then, during an image classifying Block 130, the user creates an image database, whereby image content information is saved into an image file or elsewhere to correspond to such images according to program default settings or the user's preferences. At this point, the images may be labeled as showing, for example, a buck, doe, fawn, or other animal, and/or otherwise identified, for example by location, date, time, and etc. according to program default settings or the user's preferences. Once the images are properly classified, a herd data evaluation or analysis (Block 135) is performed to generate herd census or other herd information or data based on the, for example, number(s) of bucks, does, fawns, or other image subjects on certain days, times, moon phases, and etc. After the herd data is created to generate a prediction file, Block 140 can be performed to predict animal movement or presence at a later date.

Referring now to FIG. 17, game animal movement or presence prediction Block 140 of FIG. 16 can itself be described as a sequence of Blocks. First, at Block 145, a prediction file is created which is described in greater detail elsewhere herein. User input (such as processing only buck data) may be accepted in Block 147. A prediction is generated in Block 150 by, for example, selecting a future date that corresponds to or falls within a time period of historical herd data that was used to create the prediction file. A moon phase of the future date is determined, and based on such moon phase determination of the future date, system 5 recalls (or generates) an animal activity breakdown that corresponds to analogous moon phase activity historically determined by and/or stored in the prediction file, in a reverse lookup-type procedure or manner. In some implementations of system 5, prediction generation 150 can pull the averaged information from the prediction file and then display that historical analysis as the prediction statement in a display Block 160.

For example, again referring to FIGS. 16 and 17, a user can choose to display a prediction for the last Saturday in November in the upcoming year. Assuming that the user has already loaded and classified images on system 5, the user can then create a prediction file by selecting the last week of November (or other nearby desired time period) and a year range of the previous five years. System 5 then evaluates and/or tabulates how many deer (or other image category) were seen, during which parts of the day(s), and during which moon phases, throughout the last week of November during the previous five years. Then the user requests that a prediction is displayed for the last Saturday of November in the upcoming year. System 5 determines what the moon phase will be on that particular day and refers to the prediction file to find matching or analogous (or otherwise corresponding) moon phases during the last week of November throughout the previous five years. An average animal activity breakdown during the last week of November for the previous five years is calculated for the matching or analogous (or otherwise corresponding) moon phases, and that average animal activity breakdown can be displayed as prediction statement 100 (as shown in FIG. 15 for a different time period). Thus, prediction statement 100 would show a projected likelihood of seeing deer at a particular location, based on historical data created from images taken at the same location, at the same or similar time of the year, and during a same or similar lunar (or solar) phase.

Prediction statement 100 can be presented in any of a variety of suitable ways. For example, prediction statement 100 can be expressed as (I) a more/less likely indication or (ii) a percentage indication, per sub-day time period, calculated by dividing the number of deer photographed during each sub-day time period by the total number of deer photographed during the entire day(s).

In some embodiments, a prediction check feature is incorporated into system 5. In such embodiments, after the actual hunting activity is performed (for which game animal activity was predicted), the user can input the accuracy of prediction statement 100 into system 5. In other words, users can input whether they indeed saw game animals (or specifically, bucks, etc.) into the system. If prediction statement 100 was accurate, then system 5 can retain the underlying prediction file for use in generating subsequent prediction statements. However, if prediction statement 100 was not accurate, then system 5 can delete the prediction file, disregard it for use in generating subsequent prediction statement generations, or preferably modify prediction statement 100 in some way before generating a subsequent prediction statement. Prediction files that are shown to be inaccurate during a prediction check feature can be modified according to, for example, program default settings or the user's preferences. In this regard, by utilizing the prediction check feature, a prediction file can dynamically change over time based on changes in game animal behavior, activity patterns, and/or other factors that can vary over time at a particular location.

While the principles of this invention have been described in connection with specific embodiments, it should be understood clearly that these descriptions are made only by way of example and are not intended to limit the scope of the invention.

The invention claimed is:

1. Apparatus for managing scouting images, comprising:
a scouting camera configured to record and store images of subjects at a particular location; and
an image management device including:
a processor configured to create a predictive statement based on image content of the images stored on the scouting camera or copies thereof, the predictive statement indicating a portion of a future time period that subjects are most likely to be at the particular location as compared to remaining portions of the future time period; and
a display conveying the predictive statement to a user.

2. The apparatus of claim 1 wherein the future time period is a single day.

3. The apparatus of claim 1 wherein:
the subjects are game animals and the particular location is a particular hunting location;
the predictive statement indicates relative likelihoods of game animals being at the particular hunting location for multiple portions of the future time period;
at least some of the multiple portions of the future time period occur within a time period that corresponds to a jurisdictionally-defined legal hunting period for the future time period; and
the relative likelihoods are expressed in terms of at least one of a more-or-less indication and a percentage indication.

4. The apparatus of claim 1 wherein the predictive statement includes relative likelihoods of subjects being at the particular location for morning portions, afternoon portions, and evening portions of the future time period.

5. The apparatus of claim 4 wherein the predictive statement includes relative likelihoods of game animals being at the particular hunting location for multiple morning portions and multiple evening portions of the future time period.

6. The apparatus of claim 1 wherein the processor creates the predictive statement based on images recorded within a user-defined time period.

7. The apparatus of claim 6 wherein the subjects are game animals and the user-defined time period corresponds to a jurisdictionally defined hunting season.

8. The apparatus of claim 6 wherein the processor creates the predictive statement based on occurrences of the user-defined time period over multiple years.

9. The apparatus of claim 1 wherein the predictive statement includes at least one of lunar information and solar information.

10. The apparatus of claim 1 wherein the predictive statement includes day-length information.

11. The apparatus of claim 1 wherein the display conveys global positioning information of the particular location.

* * * * *

UNITED STATES PATENT AND TRADEMARK OFFICE
CERTIFICATE OF CORRECTION

Page 1 of 1

PATENT NO.        : 9,070,188 B2
APPLICATION NO.   : 14/067406
DATED             : June 30, 2015
INVENTOR(S)       : Mark J. Cuddeback It is certified that error appears in the above-identified patent and that said Letters Patent is hereby corrected as shown below:

In the specification,
At column 3, line 57 after the word "and", insert --in--.
At column 5, line 65 delete "by" and insert --be--.
At column 7, line 6 delete "(I)" and insert --(i)--.
At column 7, line 14 delete "(I)" and insert --(i)--.
At column 7, line 60 after the word "of", insert --a--.
At column 10, line 29 delete "dear" and insert --deer--.
At column 11, line 11 delete "(I)" and insert --(i)--.
At column 13, line 57 delete "(I)" and insert --(i)--.

Signed and Sealed this
Twelfth Day of January, 2016

Michelle K. Lee
*Director of the United States Patent and Trademark Office*

UNITED STATES PATENT AND TRADEMARK OFFICE
CERTIFICATE OF CORRECTION

Page 1 of 1

PATENT NO. : 9,070,188 B2
APPLICATION NO. : 14/067406
DATED : June 30, 2015
INVENTOR(S) : Mark J. Cuddeback It is certified that error appears in the above-identified patent and that said Letters Patent is hereby corrected as shown below:

In the specification,
At column 7, line 60, after the word "system" insert --5--.

Signed and Sealed this
Thirtieth Day of August, 2016

Michelle K. Lee
*Director of the United States Patent and Trademark Office*